Dec. 16, 1969 R. E. PETERSON 3,483,837
STREAMLINED MISSILE DEVICE FOR LOCATION OF SUBMARINES
Filed Sept. 29, 1959 5 Sheets-Sheet 1

INVENTOR.
ROBERT E. PETERSON
BY
Max L. Farmer
ATTORNEYS

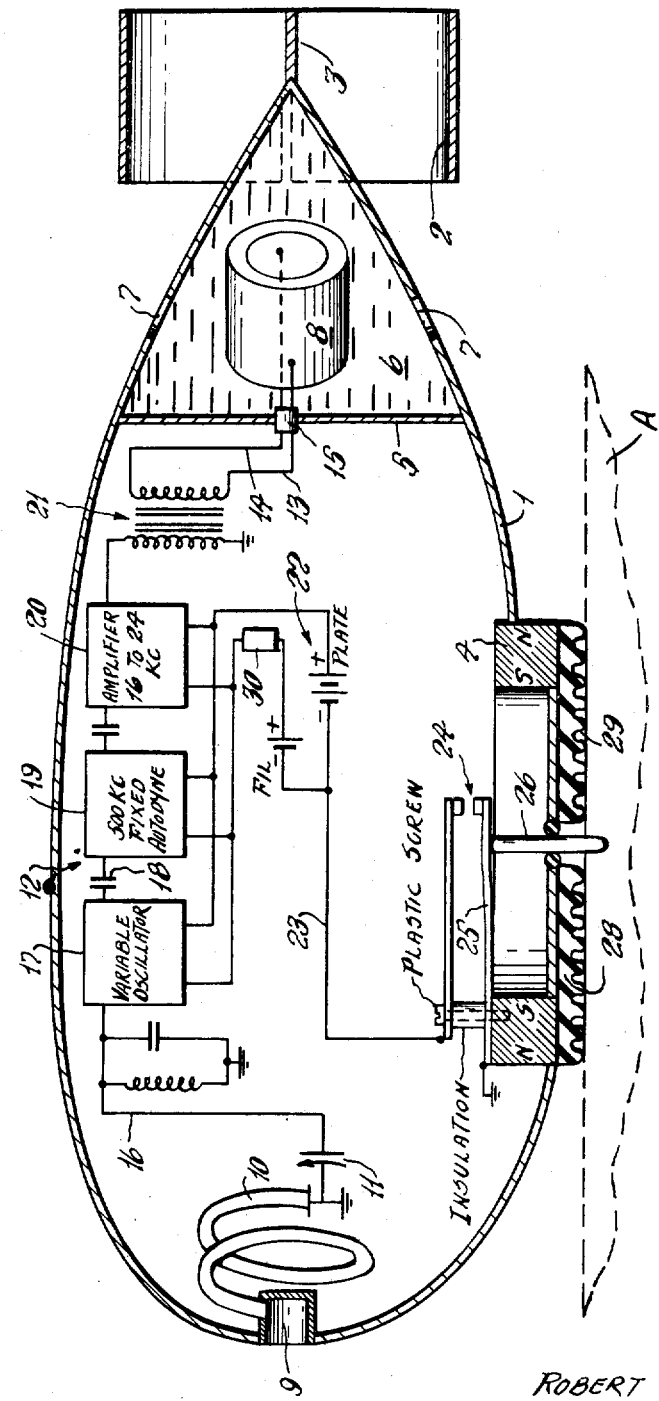

Dec. 16, 1969   R. E. PETERSON   3,483,837
STREAMLINED MISSILE DEVICE FOR LOCATION OF SUBMARINES
Filed Sept. 29, 1959   5 Sheets-Sheet 3

INVENTOR.
ROBERT E. PETERSON
BY
Max A. Garner
ATTORNEYS

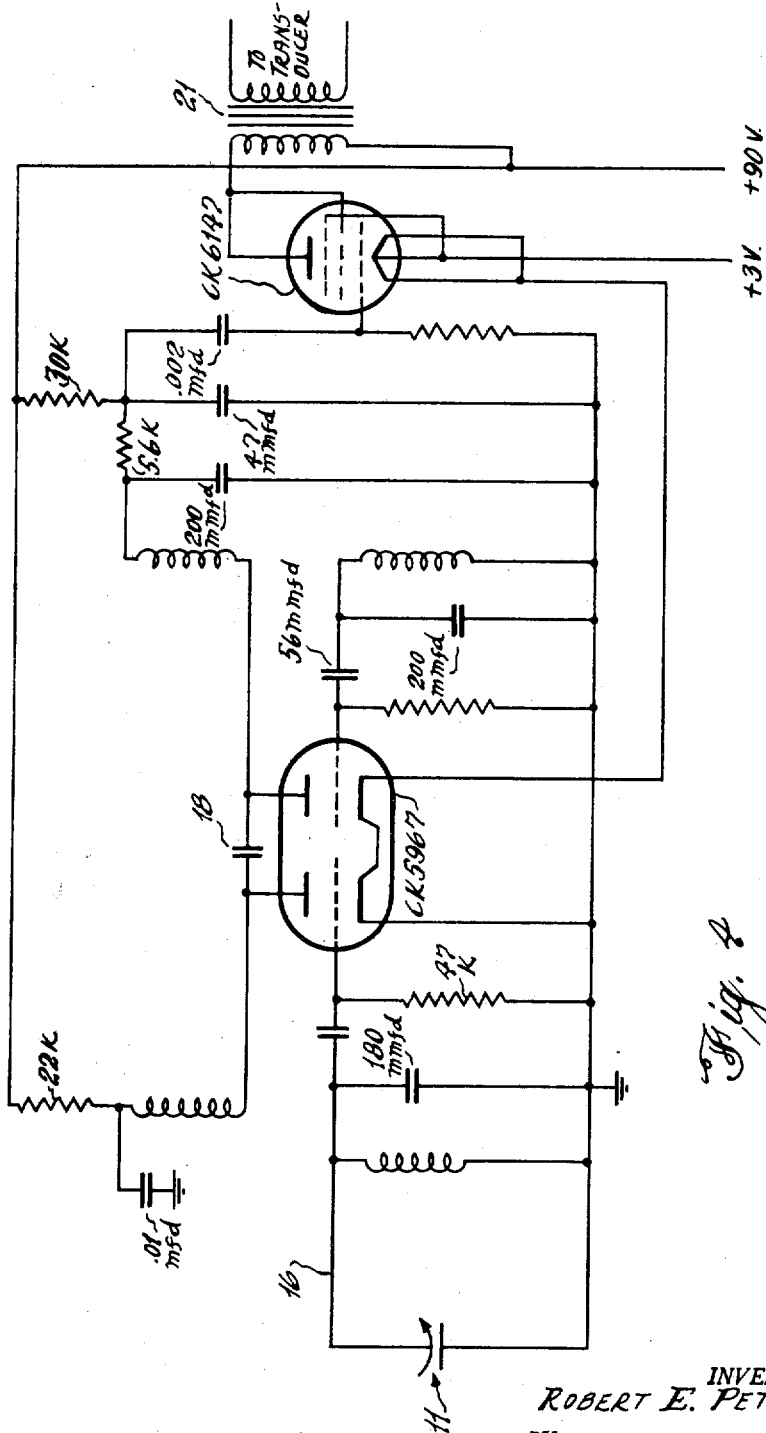

Dec. 16, 1969  R. E. PETERSON  3,483,837
STREAMLINED MISSILE DEVICE FOR LOCATION OF SUBMARINES
Filed Sept. 29, 1959  5 Sheets-Sheet 5

INVENTOR.
ROBERT E. PETERSON
BY
ATTORNEYS

United States Patent Office 3,483,837
Patented Dec. 16, 1969

3,483,837
STREAMLINED MISSILE DEVICE FOR LOCATION OF SUBMARINES
Robert E. Peterson, Rte. 1, Box 129,
Old Lyme, Conn. 06371
Filed Sept. 29, 1959, Ser. No. 843,311
Int. Cl. B63g 1/00
U.S. Cl. 114—20                                    30 Claims

ABSTRACT OF THE DISCLOSURE

A streamlined missile device that contains a normally-inactive pressure-responsive acoustic source that has a switch for activating the source, a switch actuator extending through the wall of missile, and a magnet carried by the wall of the missile adjacent to the actuator. The switch actuator is designed to be depressed relative to the missile housing when the magnet adheres the missile to a magnetic structure. A group of the missiles are cast from a ship in a pattern into an area that a submarine is thought to be lurking. If one of the missiles adheres to a submarine hull, it becomes a sonic beacon operating at a frequency related to its depth.

---

The invention described herein may be manufactured and used by or for the Government of the United States of America for governmental purposes without the payment of any royalties or therefor.

This invention relates to devices for use in locating a submerged submarine and determining its depth of submergence, and relates especially to missiles for use in such location and determination. In the detection of submerged submarines, where they are not visible from the air, underwater sound detection means have been used, but one weakness thereof is that it does not indicate the depth of submergence but only the horizontal direction, and it does not distinguish between submarines and large fish, such as whales for example, or schools of fish, or other submerged objects or bodies.

An object of this invention is to provide an improved method and apparatus for locating a submerged submarine and continuously determining and indicating its depth of submergence, even if such depth changes, also enabling one to follow a submerged submarine attempting to flee and to know its depth of submergence at all times, even if its depth is changing, which will not damage the submarine, a fact of importance to know in the absence of knowledge as to whether the submarine is friendly or enemy, and which will be relatively simple, practical, effective, and inexpensive in construction and easily employed.

Other objects and advantages will be apparent from the following description of one example of the invention, and the novel features will be particularly pointed out hereinafter in connection with the appended claims.

In the accompanying drawings:

FIG. 2 is a schematic longitudinal sectional elevation of a missile, illustrating schematically one example thereof, which may be employed;

FIG. 4 is a schematic wiring diagram of one example of a circuit which may be employed in the missile;

Figure 1:
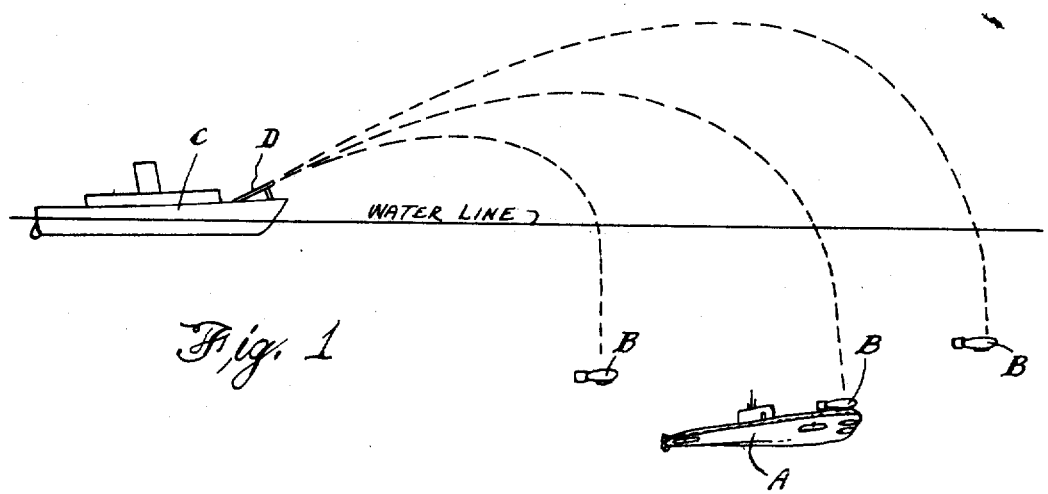
FIG. 1 is a schematic diagram illustrating one possible step in the practice of the invention.
Figure 3:
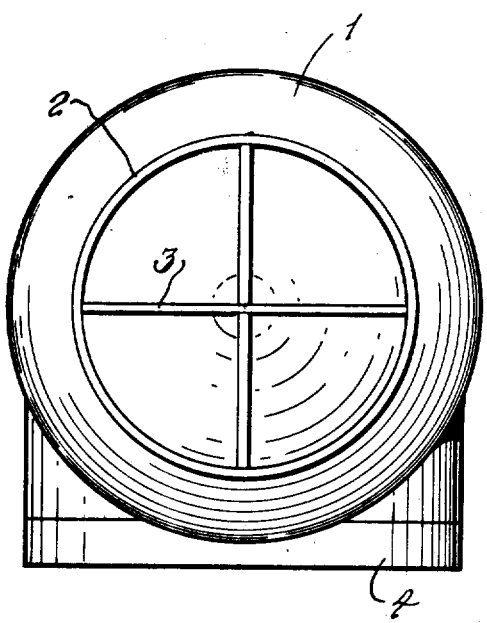
FIG. 3 is one end elevation thereof.
Figure 2A:
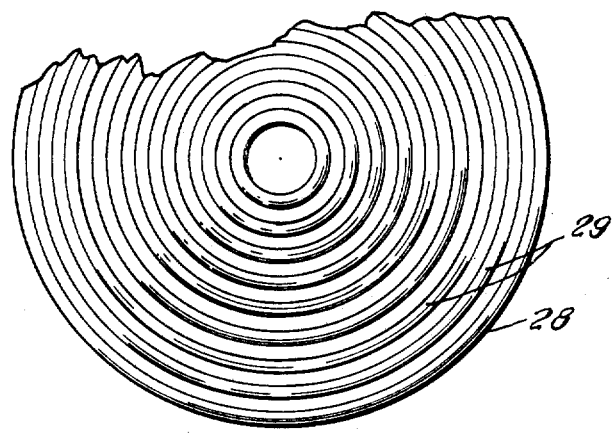
FIG. 2a is a fragmentary end view of the exposed face of the attaching magnet.

In the illustrated example of the invention, and referring to the diagram of FIG. 1, let it be desired to determine whether a suspect submerged body A located by any means is a submarine, and if it is a submarine to determine its depth of submergence. Then a plurality of missiles B, illustrated in greater detail in FIGS. 2–4, are deposited in a scattered pattern in the water of an area where the submarine suspect is believed to be, in the hope that at least one of those missiles will, in sinking, fall on any such submarine A and be attached thereto. While the missiles may be deposited in any suitable manner such as by being dropped from an air-borne carrier, they are, in the example illustrated, shot from a surface vessel C by suitable guns D mounted on the deck thereof. The missiles have means by which they will adhere to any iron or steel object with which they contact, such as by a magnet carried by each missile. The missile contains a noise maker which is activated by the adherence of the missile with a submarine.

The example of a missile illustrated in FIGS. 2–4 employs a closed hollow casing 1 which is preferably of stream-lined shape, having attached to its sharper or trailing end a shroud ring tail having a ring 2 with cross plates or tail fins 3 extending across the interior of the ring. This shroud ring tail serves to cause the missile to maintain level flight through the air as well as a straight downward path in the water. It also has the function that after attachment to a submarine, the tail will insure movement of the casing on the submarine to align the casing with the major axis of the submarine where it prevents a minimum drag to water flow. The shroud ring tail also prevents the tail fins 3 from snagging on deck protuberances like an antenna mast, and helps the missile to roll over so that its magnet can make contact with the submarine hull. Incorporated in one side wall of the casing in its part of greatest transverse diameter, is a strong magnet 4 having pole pieces at least flush with, and preferably projecting slightly from, the casing wall. This magnet may be of the permanent type as shown or an electromagnet, but in view of the availability in the market of relatively powerful, yet inexpensive permanent magnets, these are presently preferred. These magnets 4 may be of any of the various available shapes, such as the ring type in which the magnet is magnetized with the inner and outer peripheries of opposite polarities, however the ring could as well be magnetized with its end faces of opposite polarities, or a horseshoe magnet with its pole pieces at the wall of the casing may be employed.

An impervious partition 5 extends transversely across the interior of the casing near its rear or trailing end to create a chamber 6 that is sealed from the balance of the chamber in the casing. The wall of the casing at chamber 6 has one or more apertures 7 which flood the chamber 6 with sea water. In floodable chamber 6, a transducer 8 is mounted in any suitable manner so as to propagate received electrical signal as Sonar signals in the water in which it is flooded. While any underwater transducer may be employed, the barium titanate type of transducer is very satisfactory for this purpose.

In the nose of the casing 1 a small, outwardly opening recess 9 communicates with a Bourdon tube type of pressure responsive element 10 within casing 1 and which is connected to and operates a variable condenser 11 in accordance with variations in the water pressure applied to the element 10 through the recess 9. Also within the casing is apparatus designated generally by reference 12 which generates a signal that is delivered to the transducer 8 by wires 13 and 14 passing through partition 5 where the passage is sealed by any suitable sealing means 15. The variable condenser 11 has one side grounded to the shell and its other side connected by wire 16 to a variable frequency oscillator 17 operating in a selected range such as about 516 to 524 kc., depending on the position of condenser 11 as regulated by the Bourdon tube. The oscillator 17 is coupled through a condenser 18 to an autodyne or oscillating detector 19 which is maintained in a fixed oscillating condition of about 500 kc. The autodyne 19 is connected through a suitable low-pass filter to an amplifier stage 20, the filter eliminating all high frequencies and allowing the detected beat note of about 16 to 24 kc. to pass to the amplifier stage 20.

From the amplifier stage 20 to the amplified beat note is passed through an impedance matching transformer 21 to the wires 13 and 14 that are connected to the transducer 8. The power supply 22 is connected to the ground (the shell 1) by wire 23 having in series therein a switch 24, whose movable contact member 25 is operated by an attached actuator or pin 26 which passes through the exterior wall of casing 1 and projects slightly beyond shell 1 in the area closely adjacent the area through which the magnet 4 may adhere to a submarine shell. The switch operating pin 26, where it passes through the wall of casing 1 is sealed by an elastic O-ring or other suitable sealing means that exerts low friction on the switch pin. Thus, when the casing 1 adheres magnetically to a submarine A on which it may fall, the act of adhering will cause a depression of a pin or actuator 26 and a closing of switch 24, thereby activating the signal creating system which supplies to the transducer 8 a signal of a frequency which is varied automatically by the condenser 11, as operated by the Bourdon tube 10, in accordance with the water pressure on the Bourdon tube. Since such water pressure varies with the depth of the casing 1 in the water, the apparatus in casing 1 will continuously, after activation by closing of switch 24, indicate by the frequency of the signal as picked up by any receiver, the depth at all times of the submarine A, even though the latter may be changing its depth.

Figure 5:
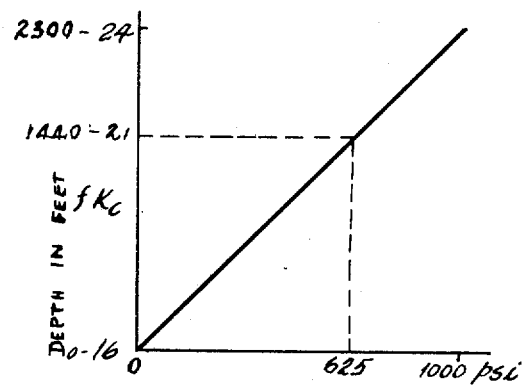
FIG. 5 is a graph illustrating a manner of converting pressure readings to depth readings.

By means of a graph such as shown in FIG. 5, one may, through knowledge of the frequency of the signal so picked up from one of the missiles, immediately ascertain the depth of the missile, and hence the depth of the submarine A to which it may be magnetically adhering. Since the magnet will not cause adherence to any object except some iron or steel object, only those missiles which are attached to a submarine will be activated to emit signals.

Figure 6:
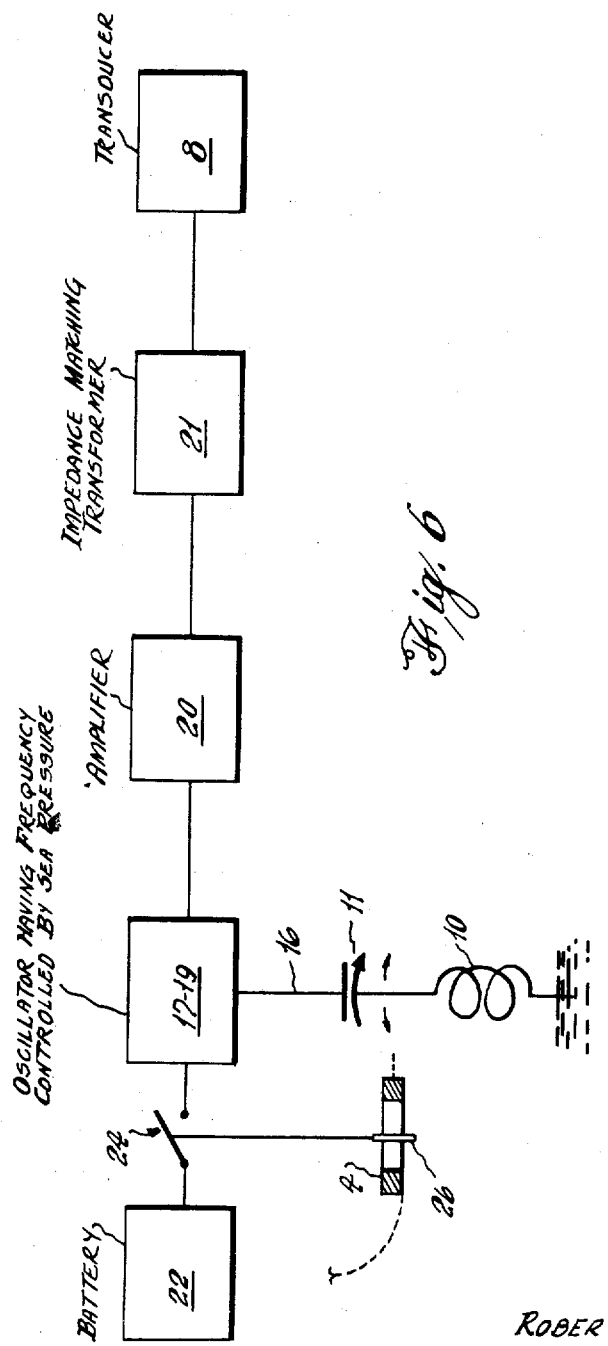
FIG. 6 is a simple block diagram illustrating the basic principle of the missile.

Any suitable construction of the signal-creating means to be connected to the transducer may be employed, but the wiring diagram of one system which will perform satisfactorily for this purpose is illustrated in FIG. 4, wherein one electronic tube such as a double triode tube CK5967 serves both variable frequency oscillator 17 and autodyne 19, the left hand half of the tube serving as part of the variable frequency oscillator, and the right hand half serving as part of the fixed frequency oscillator or autodyne. Another electronic tube CK6147 forms part of the amplifier 20 and its output is connected to the impedance matching transformer 21. The basic principle of the signalling system is illustrated in the simple block diagram of FIG. 6 which is simple and requires no detailed description.

It will be observed that this manner of locating submarines is simple and expendable, unaffected by fish or biological noises, and may be used to determine positively, quickly and by a harmless means, whether or not a suspected contact is a submarine, and if it is a submarine it can be followed and its depth at all times known, so that if depth charges are used, the charges may be set to become effective at the most effective depth where the submarine is known to be. It makes unnecessary a run using explosives that disturb the water and make successive attacks more difficult. Instead an initial run would deposit the self-attaching noise makers or missiles, and if the initial or subsequent run fails, follow-up runs can be made in water which has not been disturbed by explosives. Once one of these noisemaker missiles has been attached, the depth of a submarine is assured, because a constant and continuing knowledge of the submarine's bearing and depth means that a kill can be made with a minimum of attack runs and a minimum of depth charges.

The psychological effect on the crew of a submarine can be imagined when its Sonar operators report a loud signal is being emitted from their submarine, particularly if the signal changes frequency with every change in depth. Firing of false targets and other evasive techniques will be valueless when a submarine has been so distinctively marked. Submarines are being made to submerge to increasingly greater depths, and prior depth determining equipment is not very accurate for many water conditions. The only defense against these missiles appears to be surfacing of the submarine and then removal of the missile.

In order to increase the resistance against sliding of the missile on the surface of the submarine to which it may be attached magnetically while falling, the outwardly exposed face of the magnet 4 may be formed in any suitable manner to increase its resistance to sliding. For example, this outwardly exposed face may have outwardly projecting prongs, hooks or protuberances, preferably of soft iron, that may engage with irregularities or projections on the exterior surface of the submarine hull, or such outwardly exposed faces of magnet 4 may be covered with a thin coating or layer 28 of friction creating material such as resilient rubber having an exteriorly pebbled or irregular surface that engages with the submarine hull to increase the sliding friction between the magnet and the submarine hull after contact between them. To avoid weakening the magnetic pull by such rubber or other coating or layer, the coating or layer may have many particles of soft iron or other good flux conducting material incorporated in or distributed throughout the coating or layer to aid in carrying the magnetic flux between the magnet 4 and the hull.

The rubber or other coating or layer on the exposed face of the magnet 4 may also have on its exposed face a plurality of circular ribs 29 (FIG. 2a), concentric with the center of the magnet, and spaced apart to provide a circular, undulatory exposed surface, so that turning of the missile shell about the center axis of the magnet will be facilitated by reason of minimum friction, but sliding or linear translation of the magnet along the exposed surface of the submarine hull will be strongly resisted.

Figure 2B:
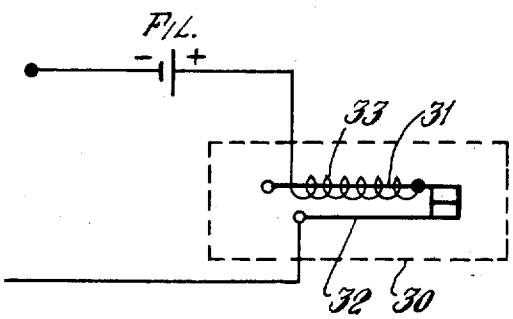
FIG. 2b is a schematic view of certain circuit details.

In order to conserve the batteries in the missiles and thus increase their life, a bimetallic switch or pulsing element 30, shown separately in FIG. 2b, may be included in series in the filament circuit so that the device will operate only intermittently. This type of pulsing switch is well known, and includes a bimetallic switch arm 31 which arches upon application of heat thereto to move it away from a relatively stationary switch arm 32. A heating coil 33 surrounds the switch arm 31 and is grounded to it. The arm 31, when cold, normally engages the switch arm 32 and this completes the filament circuit. When current flows in the filament, the coil 33 will slowly heat bimetallic arm 31 and cause it, by unequal expansion of its two metal layers, to assume the shape of an arc which carries it out of contact with switch arm 32. This opens the filament circuit and the heating coil 33 no longer heats the bimetallic switch arms so that as the latter cools, it straightens out and re-engages the switch arm 32 to reclose the filament circuit. This opening and closing is repetitive and during the opening of the filament circuit the signal sending apparatus is inactive which conserves the life of each battery.

I claim:

1. A device for use in locating a submerged submarine and continuously indicating its depth from the water surface, which comprises means for depositing a plurality of missiles in a selected scattered pattern over the area where a submerged submarine is suspected of being located, each missile having adjacent its surface a powerful magnet which will cause magnetic adherence of the missile to the exterior structure of a submarine against which it may engage in its descent in the water, means in each said missile for sending in the water surrounding the missile a vibratory signal of variable frequency, means in said missile and responsive to the pressure of the water on the missile and modifying such frequency proportionally to such water pressure, and means carried by said missile adjacent to said magnet and activated by contact of the missile with a submarine structure for setting into operation said means for sending said vibratory signal, whereby a vibratory signal receiver tuned to receive said vibratory signals can determine the depth and the direction therefrom of the submarine to which a missile is attached by the particular frequency of such signal, and a plurality of spaced apart signal receiving stations can, through the signal, ascertain the direction of and distance away from said submarine from which such signal is sent.

2. The device according to claim 1, wherein said means for depositing such missiles is a multi-projectile firing gun.

3. A missile for use in locating a submerged submarine and indicating its depth below the water surface, which comprises a closed casing having an approximately streamlined shape, with guide means adjacent its rear end and on the exterior of the casing for guiding the missile in a selected path in falling, magnetic means carried by the casing and operable to cause the magnetic adherence of the casing to the structure of a submerged submarine which the missile may engage in falling, means within the casing and operable when activated for creating and delivering into the water surrounding the casing a vibratory signal, means responsive to the pressure of the water around said casing for varying the frequency of said signal proportionally to such water pressure, means activated upon engagement of said casing with said submarine structure for setting said signal delivering means in operation to deliver said signal whereby a signal receiver tuned to the frequency range of said signal can determine the direction and depth of submergence of the submarine to which the casing is attached.

4. The missile according to claim 3, wherein said magnetic means is close to the enclosing wall of the casing and said activated means is close to said magnetic means so as to be activated by the engagement of the magnetic means portion of the casing with the submarine structure.

5. The missile according to claim 3, wherein said magnetic means is disposed at the periphery of the casing said signal creating means is electrically controlled, and said activated means is a pressure operated switch controlling said signal creating means and having an operating part projecting from the casing at the magnetic means in a position to be depressed for activation by the submarine structure when the magnetic means attaches said casing to the submarine structure.

6. The missile according to claim 3, wherein said magnetic means has pole pieces exposed through the peripheral wall of said casing.

7. The missile according to claim 3, wherein said magnetic means has a plurality of pole pieces exposed through the peripheral wall of said casing and said activated means employs a control switch with an operating member accessible for operation outside of said casing and between said pole pieces by its pressure against the submarine structure as the magnetic means pulls the casing against said structure.

8. A missile for use in locating a submerged submarine and indicating its depth of submergence, which comprises a closed casing of approximately streamlined shape with tail fins at its rear end encircled and protected by a shroud ring, said casing carrying adjacent to its periphery and along a side of the casing a magnetic element operable to adhere to the structure of a submarine with which said casing may engage in sinking, means within said casing including a transducer in a separate, flooded compartment in the rear end portion of the casing for sending vibratory signals into the water in which the casing may be submerged and adjustable in frequency during its operation, means in the forward part of the casing and responsive to the pressure of the water in which the casing is submerged for varying the frequency of the said vibratory signals proportionally to such water pressure, and means activated by adherence of the casing through said magnetic element to a submarine for causing an operation of said vibratory signal sending means, whereby when such vibratory signal is received by a receiver that detects and measures the frequency of said signals, one will known the direction of said signal and the depth of submergence of said submarine.

9. A missile for use in locating a submerged submarine, which comprises a closed casing having a generally stream-lined shape, with tail fins and a direction guiding tail fin encircling, shroud ring at the rear end and an element within the casing at the other end and responsive to the water pressure on the casing, means within the casing for creating electric signals and adjustable to vary the frequency of said signals, said casing having a flooded compartment, a transducer in said compartment and operable when activated to send vibratory signals into the water around the casing and connected to said signal creating means to receive therefrom the actuating signals and propagate them in the water around the casing, said signal creating means having its signal frequency controlled by said element proportionally to the water pressure on the exterior of the casing, control means on the casing for activating said signal creating means upon contact of a selected part of said casing with said submarine, and means carried by said casing for causing adherence of said selected part of said casing to a submarine with which the missile may engage in sinking.

10. The missile according to claim 9, wherein said last means is a magnet in said selected part of said casing wall which magnetically will adhere to the submarine upon engaging therewith.

11. A missile for use in locating a submerged submarine, which comprises a closed casing, a magnet applied to a wall of said casing for magnetic adherence of the casing to a submarine on which it may fall in sinking after deposit in the water in which a submarine may be submerged, means within said casing for creating vibratory signals, means within said casing, responsive to the water pressure on said casing and operable to vary the frequency of the signals created by said signal creating means in accordance with variations in the said water pressure, transducer means in said casing, connected to said signal creating means for receiving said signals and propagating them in the water in which the casing is submerged, and means carried by the casing and operable upon contact with a submarine by the portion of the casing wall having said magnet, for activating said signal creating means.

12. The missile according to claim 11, wherein said transducer is in a flooded compartment in said casing, a wall of which compartment is an outer wall of said casing.

13. The missile according to claim 11, wherein said means operable upon contact with a submarine is a pressure controlled switch having an operating element projecting from the casing and rendered effective by its depression in a direction into the casing.

14. The method of locating a submerged submarine and determining its depth below the water surface, which comprises depositing a plurality of missiles in a scattered pattern in the water of an area where the presence therein of a submerged and unidentified submarine is suspected, whereby one or more of the missiles in sinking may engage with the structure of a submerged submarine, and which missiles are of the type that upon engagement with said submarine will magnetically adhere thereto and be activated by such adherence to deliver into the water surrounding it a vibratory signal of a frequency proportonal to its depth, whereby such signal will automatically indicate the location and depth of submergence of such submarine.

15. The method of locating a submerged submarine which comprises scattering, in the water above a suspected contact, a plurality of missiles which when sinking may engage with and adhere to a submerged submarine, and which carry means activated upon contact with such a submarine for emitting into the water of a vibratory signal of a selected frequency that can be detected by a following receiving unit and which frequency automatically varies with the depth of the missile.

16. Apparatus for locating a submerged submarine which comprises a loose missile provided with means to magnetically attach itself to a submarine with which it may engage, in sinking after being deposited in waters where a submarine may be, and also having vibratory signal emitting means automatically activated by the act of contact of the missile with the submarine as the missile magnetically attaches itself to such a submarine, said signal emitting means being operable to deliver vibratory signal of variable frequency into the water, and means within said missile and controlled by the water pressure on the missile, for causing a variation of the frequency of said emitted signal proportionally to the said water pressure on said missile and thereby varying the frequency of the signal proportionally to the depths of the missile at any time.

17. The apparatus according to claim 16, wherein said missile has on its outer surface, at such attaching means, an adherent exposed layer of friction creating material to resist sliding of the missile on a submarine hull after attachment thereto.

18. The apparatus according to claim 17, wherein said layer is of resilient material having incorporated therein particles of good magnetic flux conducting material to aid in carrying the magnetic flux between the missile and the submarine hull.

19. The apparatus according to claim 17, wherein said layer of friction creating material has on its exposed face a plurality of generally circular ribs that are spaced apart and approximately concentric with an axis through the center of said attaching means whereby the missile, when attached to a submarine hull, may rotate about said axis with minimum friction, but the ribs will resist linear sliding of the missile on the submarine hull.

20. The apparatus according to claim 19, wherein said layer is of resilient material having incorporated therein particles of good magnetic flux conducting material to aid in carrying the magnetic flux between the missile and the submarine hull.

21. The missile according to claim 11, and means controlled by the means that is activated by adherence of the casing to a submarine, for causing intermittent operation of the said signal sending means during the period when the signal sending means is activated, whereby the consumption of power for the signal sending means will be conserved.

22. The missile according to claim 11, wherein the outer surface of the missile is approximately streamlined, with tail fins encircled by a ring shroud and at the magnetic area has approximately circular, concentric ribs of frictional material that upon contact with a submarine hull provides a low rotational friction but high sliding friction for the missile, whereby when a missile becomes magnetically attached to a submarine hull it can easily rotate about the axis of the magnet to present a streamlined position to any movement of said hull, and will be held by relatively high friction against linear sliding on the hull.

23. A missile for use in locating a submerged submarine, which comprises a closed casing, a magnet applied to a wall of said casing for magnetic adherence of the casing to a submarine on which it may fall in sinking after deposit in the water in which a submarine may be submerged, means including a transducer within said casing for creating vibratory signals and emitting them into the water in which the casing is submerged, said transducer being in a flooded compartment in said casing, one wall of which compartment is an outer wall of said casing.

24. A complete loose and self-contained missile for use in locating a submerged submarine, which comprises a closed casing, a magnet applied to a wall of said casing for magnetic adherence of the casing to a submarine on which it may fall in sinking after deposit in the water in which a submarine may be submerged, electrically operated means within said casing for creating vibratory signals and propagating them in said water, and means operable upon contact of the missile with a submarine for activating said electrically operated means and including a pressure controlled switch having a control member projecting from the casing adjacent said magnet and operated by its contact with the submarine to activate said signal creating means.

25. Apparatus for use in locating a submerged submarine which comprises a loose, self-contained missile provided with means to magnetically attach itself to a submarine with which it may engage in sinking after being deposited in waters where a submarine may be, and also having vibratory signal emitting means in the water in which the missile may be submerged, automatically activated by the act of contact of the missile with the submarine as the missile magnetically attaches itself to such a submarine, said missile having on its outer surface around said attaching means an adherent exposed layer of friction creating material to resist sliding of the missile along the surface of a submarine hull after attachment thereto.

26. The apparatus according to claim 25 wherein said layer is of resilient material having incorporated therein particles of good magnetic flux conducting material to aid in carrying the magnetic flux between the missile and the submarine hull.

27. The apparatus according to claim 25 wherein said layer of friction creating material has on its exposed face a plurality of generally circular progressing ribs that are spaced apart and approximately concentric with an axis through the center of said attaching means whereby the missile, when attached to a submarine hull, may rotate about said axis with minimum friction, but the ribs will resist linear sliding of the missile on the submarine hull.

28. The apparatus according to claim 27 wherein said layer is of resilient material having incorporated therein particles of good magnetic flux conducting material to aid in carrying the magnetic flux between the missile and the submarine hull.

29. The apparatus according to claim 25, and means controlled by the means that is activated by adherence of the casing to a submarine, for causing intermittent operation of the said signal sending means during the period when the signal sending means is activated, whereby the consumption of power for the signal sending means will be conserved.

30. A missile for use in locating a submerged submarine, which comprises a closed casing, a magnet applied to a wall of said casing for magnetic adherence of the casing to a submarine on which it may fall in sinking after deposit in the water in which a submarine may be submerged, means within said casing for creating vibrating signals, the outer surface of the missile around the magnetic area having approximately circular, concentric ribs of frictional material that upon contact with a submarine hull provides a low rotational friction but high sliding friction for the missile, whereby when a missile becomes magnetically attached to a submarine hull it can easily rotate about the axis of the magnet to present a stream lined position to any movement of said hull, and will be held by relatively high friction against linear sliding on the hull.

References Cited

UNITED STATES PATENTS

| | | | |
|---|---|---|---|
| 297,648 | 4/1884 | Tuck | 340—4 |
| 2,405,990 | 8/1946 | Beechlyn | 114—21.2 |
| 2,750,794 | 6/1956 | Downs | 340—2 |
| 2,656,458 | 10/1953 | Johnston et al. | 340—2 |
| 2,545,179 | 3/1951 | Voorhees | 340—2 |
| 2,397,995 | 4/1946 | Wikstrom | 114—20 |
| 1,460,175 | 6/1923 | Rayder | 114—20 |
| 1,300,062 | 4/1919 | Walker | 340—4 |

BENJAMIN A. BORCHELT, Primary Examiner

G. H. GLANZMAN, Assistant Examiner

U.S. Cl. X.R.

340—5